(12) United States Patent
Toulmay et al.

(10) Patent No.: US 6,364,615 B1
(45) Date of Patent: Apr. 2, 2002

(54) BLADE FOR THE ROTARY WINGS OF AN AIRCRAFT

(75) Inventors: François Valentin Gaston Toulmay, Vitrolles (FR); Mathieu Rebut, Jingdezhen/Jiangxi (CN); Peter Rudolf Stahl, Bad Albling (DE)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/573,983

(22) Filed: May 19, 2000

(30) Foreign Application Priority Data

May 21, 1999 (FR) .............................. 99 06452

(51) Int. Cl.⁷ .............................................. B64C 11/16
(52) U.S. Cl. ............. 416/223 R; 416/228; 416/DIG. 2; 416/DIG. 5
(58) Field of Search .............................. 416/223 R, 228, 416/DIG. 2, DIG. 5

(56) References Cited

U.S. PATENT DOCUMENTS

| | | | | |
|---|---|---|---|---|
| 4,451,206 A | * | 5/1984 | Philippe et al. ............. | 416/228 |
| 4,880,355 A | * | 11/1989 | Vuillet et al. ............... | 416/228 |
| 5,332,362 A | * | 7/1994 | Toulmay et al. ......... | 416/223 R |
| 6,000,911 A | * | 12/1999 | Toulmay et al. ......... | 416/223 R |

FOREIGN PATENT DOCUMENTS

| | | |
|---|---|---|
| EP | 0493303 | 7/1992 |
| EP | 0901961 | 3/1999 |
| FR | 2153253 | 5/1973 |
| FR | 2617118 | 12/1988 |
| FR | 2689852 | 10/1993 |
| FR | 2755941 | 6/1998 |
| FR | 2768121 | 3/1999 |
| FR | 9716227 | 6/1999 |

OTHER PUBLICATIONS

French Novelty Search Report, dated Feb. 11, 2000.

* cited by examiner

*Primary Examiner*—Edward K. Look
*Assistant Examiner*—Ninh Nguyen
(74) *Attorney, Agent, or Firm*—Stevens, Davis, Miller & Mosher, LLP

(57) ABSTRACT

The present invention relates to a blade with a swept-back tip for the rotary wings of an aircraft, particularly a helicopter, said blade (1) being formed from successive elementary cross sections.

According to the invention, with said blade (1) being subdivided into various zones, the chord length L and the offset Y'f of the aerodynamic center with respect to the feathering axis (OX), as well as the relative thickness of each elementary section, are optimized for flight within a moderate speed range.

10 Claims, 5 Drawing Sheets

BLADE FOR THE ROTARY WINGS OF AN AIRCRAFT

The present invention relates to a blade for the rotary wings of an aircraft, in particular a helicopter, said blade making it possible simultaneously to reduce noise and improve the performance at high load, especially at takeoff and at moderate flight speed.

It is known that, both in hovering flight and in forward flight, the performance of a rotor of a rotary-wing aircraft, especially a helicopter, is limited by the following phenomena:

the shockwaves which develop on the suction face of the advancing blades during high-speed flights;

the stalling that results from the detachment of the boundary layer on the suction face of the retreating blades when there is a demand for lift in translational flight;

the interaction of the vortex generated by the previous blade with the following blade, which leads, during hovering flight, to a substantial dissipation of energy in two forms: induced power and profile drag power.

In addition to being responsible for loss of performance, the shocks and the blade-vortex interaction are also responsible for acoustic problems in the form of pulsating noise, caused by shock delocalization (high-speed flight) and by pulsating changes in lift when the marginal vortex directly strikes the blade (decent), respectively.

It has been found that the performance of a blade for the rotary wings of an aircraft depends, to a large extent, on parameters associated with the construction of the blade, such as:
a) the radial distribution of the blade area;
b) the sweepback of the blade tip;
c) the change in relative thickness of the profiles;
d) the distribution of the twist of the profiles; and
e) the blade tip droop.

The influence that the three main parameters a), b) and c) have on the performance and on the noise of a rotary-wing blade is explained in detail below.

a) Radial Distribution of the Blade Area

For a rotor of a rotary-wing aircraft whose elementary profiles or sections all work with the same coefficient of lift Cz, the linear lift varies as the local chord length L(r) and as the square of the local speed, which is directly proportional to the radius (radial position) $\underline{r}$ of the section. This means that the total lift of the blade varies proportionally with the mean chord $\overline{L}$ defined by a square-law weighting of the radius $\underline{r}$:

$$\overline{L} = \frac{\int_{RO}^{R} L(r)r^2 dr}{\int_{RO}^{R} r^2 dr}$$

in which RO represents the radius $\underline{r}$ at the start of the blade section at the root end of the blade and R is the total radius of the blade.

It is common practice for the performance of blades of various shapes to be compared, by referring them to this mean chord $\overline{L}$.

Compared with a conventional blade of rectangular shape, calculations show, and experience confirms this, that a reduction in the chord at the outboard end of the blade (tapered shape) improves performance over a wide speed range, including in hovering flight. In translational flight, this improvement is explained essentially by the reduction in the drag of the profiles, which is due to the reduction in the profile drag due to the reduction in the chord at the tip. Shocks in this region are exerted on a smaller area while the central part of the blade, not subjected to the shocks, provides most of the lift with a maximum efficiency: the lift/drag ratio here is a maximum. At low speed and in hovering flight, the tapering of the tip improves the lift efficiency-that is to say makes it possible to reduce the power needed for a given lift force-according to a different mechanism: a more homogeneous induced velocity distribution is obtained over the entire rotor disk, preventing the load from being too concentrated at the tip. The distribution thus approaches the optimum distribution for the lift efficiency, which consists of a uniform induced velocity over the entire disk.

A second known advantage provided by the outboard taper of the blade is a certain reduction in the noise. On the one hand, the volume of air displaced by the high-speed passage of the tip is reduced as the square of the chord (for the same relative thickness of the profiles). This results in a reduction in some of the noise still present, that corresponding to the noise called "monopole source". On the other hand, the blade edge vortex, at the origin of the blade-vortex interaction noise, curls more slowly and the maximum velocity in the core of this vortex is lower the greater the distance between the maximum chord zone and the tip. This results in appreciable attenuation of the interaction noise, particularly during the decent phases of the aircraft.

However, the outboard tapering of the blade has the drawback of requiring an increase in the chord over the rest of the span, so as to maintain the constant mean chord $\overline{L}$ and so as not to excessively increase the coefficient of lift Cz of the profiles. This increase in the chord may be significant because of the $r^2$ weighting in the expression for $\overline{L}$ (see above) and this results in the rotor being somewhat heavier. Nevertheless, the tapering on the blade tip side over a moderate length, of the order of 5 to 6% of the rotor radius, is a means commonly employed for improving the performance of the latter, generally in combination with sweepback of the blade tip, as illustrated in Patents FR-2,755,941, FR-2,689,852 and FR-2,617,118.

The tapering of the chord on the inboard side of the blade, that is to say on the side where it is attached to the hub, is a known means of limiting the drawback of an increase in mass and of improving the performance at high speed, that is to say above 300 km/h, since, under these conditions, this zone of the blade contributes little to the lift and greatly to the power consumed by the rotor (see Patents FR-2,755,941 and FR-2,689,852). However, this arrangement proves to be unfavorable in the case of the performance at moderate speed and in hovering flight since it tends to excessively reduce the load in the central zone of the rotor and to make the induced velocity distribution less uniform, thereby resulting in a reduction in the lift efficiency.

b) Offset of the Profiles in the Plane of the Rotor, with Part of the Blade Swept Back In addition, in order to push back the threshold at which shockwaves appear and to limit their intensity, it is advantageous for the blade tip to be curved nearward (Patents FR-2,755,941 and FR-2,689,852 and Patent Application FR-97/16227) or else for it to have a double curvature, alternately toward the front and the rear (Patent FR-97/11230). The sweep angle Λ, defined by the line of aerodynamic centers (approximately at the front quarter of the chord) and the feathering axis, reduces the effective Mach number and thus sweeping back the blade tip constitutes an effective means of reducing the unfavorable consequences of the compressibility of air, especially the appearance of shockwaves.

However, it is new known (Patent Application FR-97/16227) that the sweep angle must remain modest, typically less than 35°, so as to avoid the formation of a three-dimensional ram's horn vortex—or apex vortex—similar to that observed on delta-type wings. This is because this type of very stable and concentrated vortex produces intense interactions with the following blades and therefore contributes to the noise of a helicopter as it descends.

Furthermore, the magnitude of the offset with respect to the feathering axis, and the span length of the zone in question, also limited by the torsional forces which result from the offset of the aerodynamic lift as well as of the center of gravity. A known means for limiting this unfavorable effect consists in shifting the profiles of the mid-part forward and those of the tip rearward in such a way that the blade remains balanced overall: see, in particular, Patents FR-2,755,941, FR-2,689,852 and FR-97/11230.

c) Change in the Relative Thickness of the Profiles

The relative thickness of a blade cross section is defined as the ratio of the absolute thickness $e$ with respect to the chord length L of the profile that constitutes the contour of this section, i.e. e/L.

Blades whose shape is optimized exclusively for high speeds (Patent FR-2,755,941) or for noise reduction (Patent FR-97/11230) exhibit a variation in the relative thickness of the profiles which increases slowly from the tip toward the central part, with a thickness approximately equal to 7% at the tip and remaining less than 11% at the section located at 75% of the rotor radius. This arrangement, which is favorable to the high-speed performance with a moderate lift and allows noise reduction, is nevertheless subject to premature stalling whatever the speed, including in hovering flight. In general, this arrangement proves to be of low performance with strong lift.

It has in fact been discovered that the profiles offering the best compromise between efficiency (Cz/Cx ratio for moderate lift) and maximum lift ($Cz_{max}$) for sections lying between 50% and 75% (Mach number between 0.3 and 0.6) have a relative thickness of between 12 and 14%.

It may therefore be seen that none of the above documents describes a blade structure entirely without drawbacks.

The object of the present invention is to remedy these drawbacks. It relates to a blade for a rotary wing, the geometry of which is optimally defined so as to guarantee the best performance for an aircraft, especially a helicopter, the lift of which is provided by such a wing, said aircraft flying within a moderate speed range, of between, for example, 0 (hovering flight) and 300 km/h, and being capable of flying and maneuvering with a high load in hot weather and at altitude, these conditions being characterized by a mean coefficient of lift $Cz_m$ of the profiles which can reach a value of 0.7. This blade must furthermore generate limited noise, especially during landing phases.

For this purpose, according to the invention, the blade with a swept-back tip for the rotary wings of an aircraft, intended to form part of a rotor whose hub is linked to said blade, which blade is capable of being driven in rotation about the axis of said hub, said blade having a leading edge and a trailing edge, and being formed from successive elementary cross sections identified by the distance $r$ which separates each of them from the rotation axis of said hub, and each having a defined chord profile and an aerodynamic center whose offset with respect to the feathering axis, orthogonal to each of said sections, determines the sweep-back of said blade, is remarkable in that said blade being subdivided along its longitudinal extent into three zones, namely a first zone extending from the inboard end RO of the blade to a section R1 located at approximately 90% of the total length of the blade, a second zone extending from the section R1 to a section R2 located at approximately 95% of the total length of the blade and a third zone extending from the section R2 to the free outboard end R of the blade:

the length of the chord L is a maximum and approximately constant in said first zone, decreases linearly in said second zone and decreases according to a parabolic function in said third zone while respecting the continuity of the rate of variation of the chord at the common limit with the second zone; and the offset Y'f of the aerodynamic center with respect to the feathering axis is approximately zero in said first and second zones and decreases according to a parabolic function in said third zone, while respecting the continuity of the sweep angle at the common limit with the second zone. This decrease is furthermore chosen so that the trailing edge remains straight and continuous along said second and third zones.

Thus, the blade geometry as defined makes it possible to guarantee the optimum performance for a rotary-wing aircraft, especially a helicopter, the lift of which is provided by a wing consisting of such blades, said aircraft flying within a moderate speed range of between 0 and 300 km/h for example, with a mean coefficient of lift of the profiles $Cz_m$ which can reach a value of 0.7.

In addition, by virtue of the invention, said blade produces limited noise, especially during landing phases (reduction in blade-vortex interaction noise).

With regard to the variation in chord length, the invention provides for quite a large taper on the tip side (uniformity of the induced velocity in hovering flight and reduction in the volume at the tip in order to minimize noise of monopolar origin) without there having to be a taper on the attachment side (uniformity of induced velocity and maximum torsional rigidity).

Thus, the start of the taper is further from the tip than in the case of the blade disclosed in Patent FR-2,617,118 and is located more or less at the same position as in Patent FR-2,755,941 or FR-2,689,852, but with a chord which remains constant toward the blade root.

The recommended chord variation, as well as the maximum and minimum limiting curves between which the abovementioned advantages may be obtained, will be specified below.

Moreover, since the aerodynamic center is defined here as the point on each section lying at the front quarter between the leading edge and the trailing edge, the offset Y'f is the distance, in the direction of the chord, between the feathering axis and said center, counted positively when the displacement of the section takes place toward the leading edge. The sweep angle Λ is defined as the angle between the tangent to the curve joining the centers of the sections and the feathering axis, seen from above. The sweep is directed rearward from the tip side of the blade. The angle Λ is calculated directly from the law of variation of Y'f:Λ(r)=arctan(dY'f/dr).

Given the envisaged speed range, the favorable effect of the sweep angle reducing the intensity of the shocks is fully obtained for values of the sweep angle Λ not exceeding 33°, this maximum value being reached only at the blade tip. This value, which is markedly smaller than those recommended in Patents FR-2,755,941, FR-2,689,852 and FR-2,617,118, is intended to avoid the formation of a ram's horn leading-edge vortex.

In the present invention, the angle Λ is limited by virtue of the very gradual reduction in the chord, combined with a straight trailing edge over the entire blade part lying between the widest chord and the tip.

Another favorable consequence of this novel arrangement is that the rearward offset of the aerodynamic center at the tip, with respect to the feathering axis, remains particularly small so that the torsional forces and the forces to which the pitch control system is subjected remain very moderate (without it being necessary to produce balancing by an offset in the opposite direction of the internal part of the blade).

The division of the blade into three zones, as described above, applies in the same way to the law of variation of the offset Y'f and the sweep angle Λ which stems therefrom. As indicated above, in the first two zones, the offset is approximately zero and, in the third zone, it decreases parabolically while respecting the continuity of the angle Λ at the common limit with the second zone.

The recommended variation (law of variation) of the offset Y'f, together with the maximum and minimum bounding curves between which the aforementioned advantages may be obtained, will be specified below.

Within the context of the present invention, the best blade performance is obtained by combining the variation of the chord length L and that of the offset Y'f of the aerodynamic center, as defined above, with a particular variation, and in accordance with the invention, of the relative thickness of the blade.

For this purpose, advantageously, said blade being, in addition, subdivided along its longitudinal extent into three additional zones, namely a first additional zone extending from the inboard end RO of the blade to a section R3 located at approximately 50% of the total length of the blade, a second additional zone extending from the section R3 to a section R4 located at approximately 75% of the total length of the blade and a third additional zone extending from the section R4 to the free outboard end R of the blade, the relative thickness of the blade, which corresponds to the ratio and the absolute thickness e to the chord length L:

decreases approximately linearly with an approximate slope of –0.12% of thickness per % of span in said first additional zone so as to end up with a relative thickness approximately equal to 12% in the section R3;

remains constant and approximately equal to 12% in said second additional zone; and decreases approximately linearly in said third additional zone so as to reach a value approximately equal to 7% at the free outboard end of the blade.

The recommended variation in the relative thickness, together with the maximum and minimum limiting curves between which the abovementioned advantages may be obtained, will be specified below.

Moreover, in one particular embodiment, the vertical displacement Zv from the center of twist with respect to the plane of zero lift of the blade is such that the center of twist remains approximately in said plane in the aforementioned first and second zones (relative to the chord length and to the offset Y'f), and in the third zone:

$$Zv(r/R)/R = 0.0905\ x^2 \text{ with } x=(r-R2)/(R-R2).$$

This variation in the vertical offset or displacement Zv makes it possible to improve the lift efficiency at takeoff.

However, it is also conceivable within the context of the invention to apply no vertical offset so as to limit the vibration excitation in translational flight, renouncing the advantage provided in terms of lift efficiency.

Furthermore, advantageously, the blade has a linear aerodynamic twist with a total amplitude of approximately –10° between the center of the rotor and the free outboard end R of the blade. In accordance with common practice, the twist is counted negatively when the leading edge of the outer sections is reduced with respect to that of the sections lying closer to the center. In order to obtain the geometrical setting of each section, counted with respect to the reference chord, it is necessary to add (algebraically) the effect of the zero lift of the profile in question on the aerodynamic twist.

The figures of the appended drawing will make it clearly understood how the invention may be realized. In these figures, identical references denote similar elements.

Figure 1:
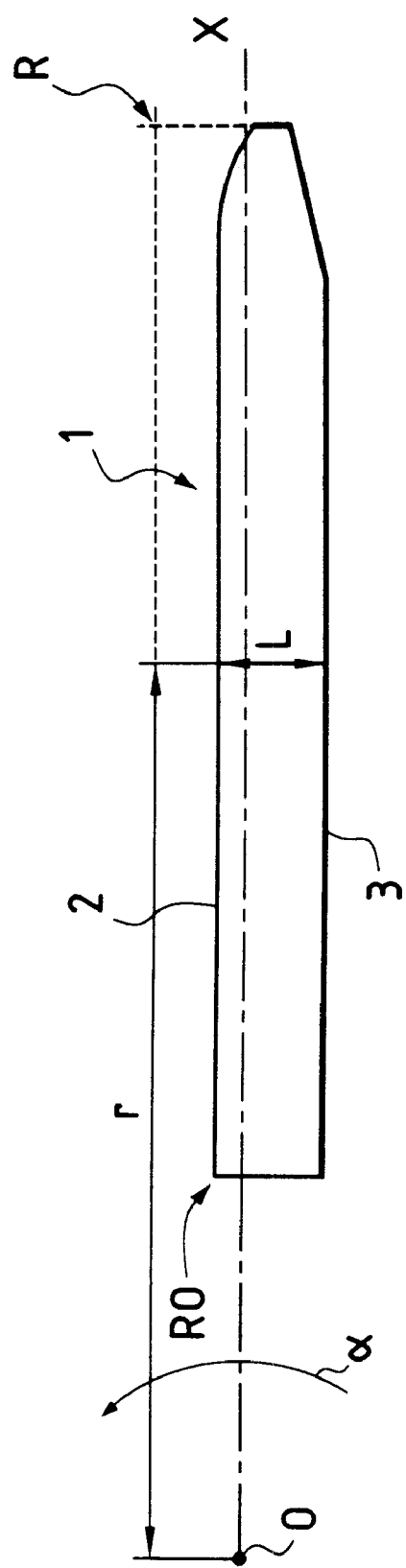
FIG. 1 is a plan view of a helicopter rotor blade according to the present invention.

The blade 1 with a swept-back tip, according to the present invention and shown in FIG. 1, forms part of a rotor (not illustrated). Said blade 1 is linked, in a known manner, to the hub of the rotor by members (not illustrated) for the hinging and retention of the blade, particularly a hinge for changing the pitch of the blade about an axis OX called the axis of controlled pitch variation or feathering axis.

Moreover, the blade 1, having a leading edge 2 and a trailing edge 3, is formed from successive elementary transverse sections. Each elementary section is identified by the distance $r$ separating said section from the axis of rotation passing through a point O on the rotor, and has a defined chord profile and an aerodynamic center (the point of application of the variations in aerodynamic lift forces). In addition, it is known that the offset of the aerodynamic center with respect to the feathering axis OX, orthogonal to said successive sections, defines the sweep of the blade.

The geometrical construction allowing the surface of a blade 1 according to the invention to be rigorously defined will be described below.

The construction reference frame is chosen as an orthonormal coordinate system whose origin O is the center of the rotor.

As indicated above, the OX axis is the feathering axis so that the first coordinate coincides with the radius $r$ counted from the center of rotation O. A second axis OY (not illustrated), orthogonal to the OX axis, constitutes the setting reference direction and is directed, arbitrarily, toward the leading edge 2. A third axis, OZ, also not illustrated, is orthogonal to the plane defined by the OX and OY axes and is directed, arbitrarily, upward (suction face of the profiles). The coordinate system is in the direct direction if the rotor rotates anticlockwise α. However, it is clearly understood that everything that follows remains valid in the case of a rotor rotating clockwise.

The OX–OY plane will be called the construction plane or reference plane. The OX–OY plane will be chosen so as to coincide with the plane of zero lift of the blade. The area of the blade (envelope of the blade) is generated by a set of elementary plane sections which are all parallel to one another and to the OX–OZ plane, and are orthogonal to the feathering axis OX.

Each elementary section may be defined by its radius $r$ (the distance of the section from the OY axis), lying between RO (start of the span) and R (blade tip).

The parameters defining the contour of any elementary cross section of the blade 1 are generally known, especially from Patent FR-2,689,852.

The blade forming the subject of the invention is subdivided into three zones Z1, Z2 and Z3, making it possible to describe the blade independently of the relative section thickness which requires special divisions specified below. These three zones are:

a first zone Z1, which extends from the section RO, corresponding to the start of the span, as far as a section R1 located approximately at 90% of the total radius R;

a second zone Z2, which extends from the section R1 as far as a section R2 located approximately at 95% of the total radius R; and a third zone Z3, which extends from the section R2 as far as the free end of the blade (radius R).

According to the invention, in these various zones Z1, Z2 and Z3:

the length of the chord L is a maximum and approximately constant in said first zone Z1, decreases linearly in said second zone Z2 and decreases according to a parabolic function in said third zone Z3 while respecting the continuity of the rate of variation of the chord at the common limit with the second zone Z2; and the offset Y'f of the aerodynamic center with respect to the feathering axis is approximately zero in said first and second zones Z1 and Z2, and decreases according to a parabolic function in said third zone Z3, while respecting the continuity of the sweep angle at the common limit with the second zone Z2 and ensuring the straightness of the trailing edge 3 along the zones Z2 and Z3.

Figure 2:
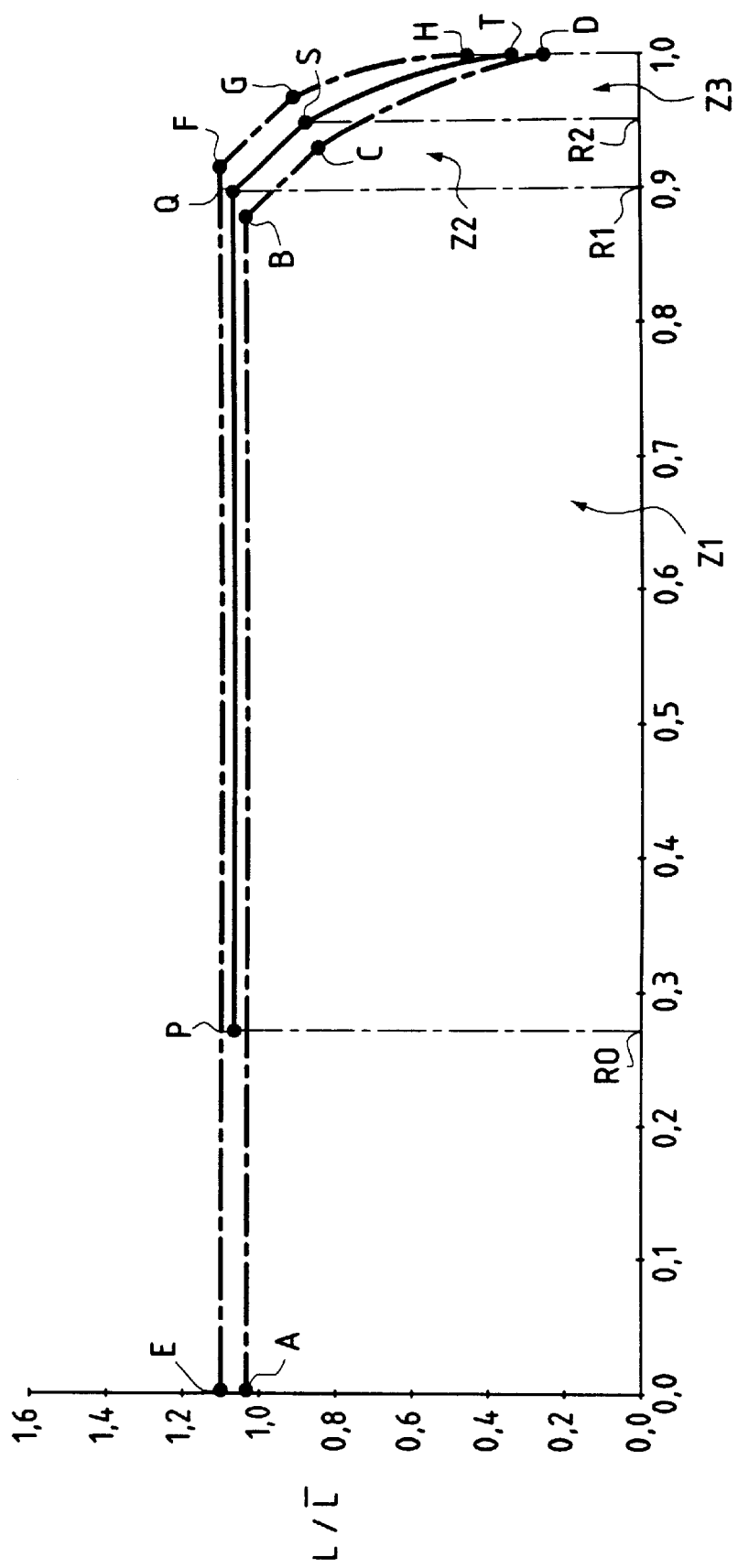
FIG. 2 is a curve showing the variation in the chord length along the longitudinal extent of the blade.

As may be seen in FIG. 2, the variation or law of variation in the chord length L with respect to the mean length $\bar{L}$ of the latter may advantageously be between:

a lower bound ABCD, such that the coordinates of the points A, B, C and D are the following:

|   | r/R | L/$\bar{L}$ |
|---|---|---|
| A | 0 | 1.04 |
| B | 0.88 | 1.04 |
| C | 0.93 | 0.86 |
| D | 1 | 0.25 | the lines AB, BC and CD joining these points, in order to form the bound ABCD, being such that:

|    | x | L/$\bar{L}$ |
|---|---|---|
| AB | (r-Ra)/(Rb-Ra) | 1.04 |
| BC | (r-Rb)/(Rc-Rb) | 1.04 − 0.18 x |
| CD | (r-Rc)/(Rd-Rc) | 0.86 − 0.252 x − 0.358 $x^2$ |

Ra, Rb, Rc and Rd representing the respective position of A, B, C and D along the blade and $\underline{x}$ being a parameter; and an upper bound EFGH, such that the coordinates of the points E, F, G and H are the following:

|   | r/R | L/$\bar{L}$ |
|---|---|---|
| E | 0 | 1.1 |
| F | 0.92 | 1.1 |
| G | 0.97 | 0.92 |
| H | 1 | 0.45 | the lines EF, FG and GH joining these points, in order to form the bound EFGH, being such that:

|    | x | L/$\bar{L}$ |
|---|---|---|
| EF | (r-Re)/(Rf-Re) | 1.1 |
| FG | (r-Rf)/(Rg-Rf) | 1.1 − 0.18 x |
| GH | (r-Rg)/(Rh-Rg) | 0.92 − 0.108 x − 0.362 $x^2$ |

Re, Rf, Rg and Rh representing the respective position of E, F, G and H along the blade.

Between the lower bound ABCD and the upper bound EFGH, a preferred curve PQST, as shown in FIG. 2, is formed by points P, Q, S and T, the coordinates of which are the following:

|   | r/R | L/$\bar{L}$ |
|---|---|---|
| P | 0.2682 | 1.0694444 |
| Q | 0.9 | 1.0694444 |
| S | 0.95 | 0.8911111 |
| T | 1 | 0.3333333 | the lines PQ, QS and ST joining these points, in order to form the curve PQST, being such that:

|    | x | L/$\bar{L}$ |
|---|---|---|
| PQ | (r-Rp)/(Rq-Rp) | 1.0694444 |
| QS | (r-Rq)/(Rs-Rq) | 1.0694444 − 0.1783333 x |
| ST | (r-Rs)/(Rt-Rs) | 0.8911111 − 0.1783333 x − 0.3794445 $x^2$ |

Rp, Rq, Rs and Rt representing the respective position of P, Q, S and T along the blade.

Figure 3:
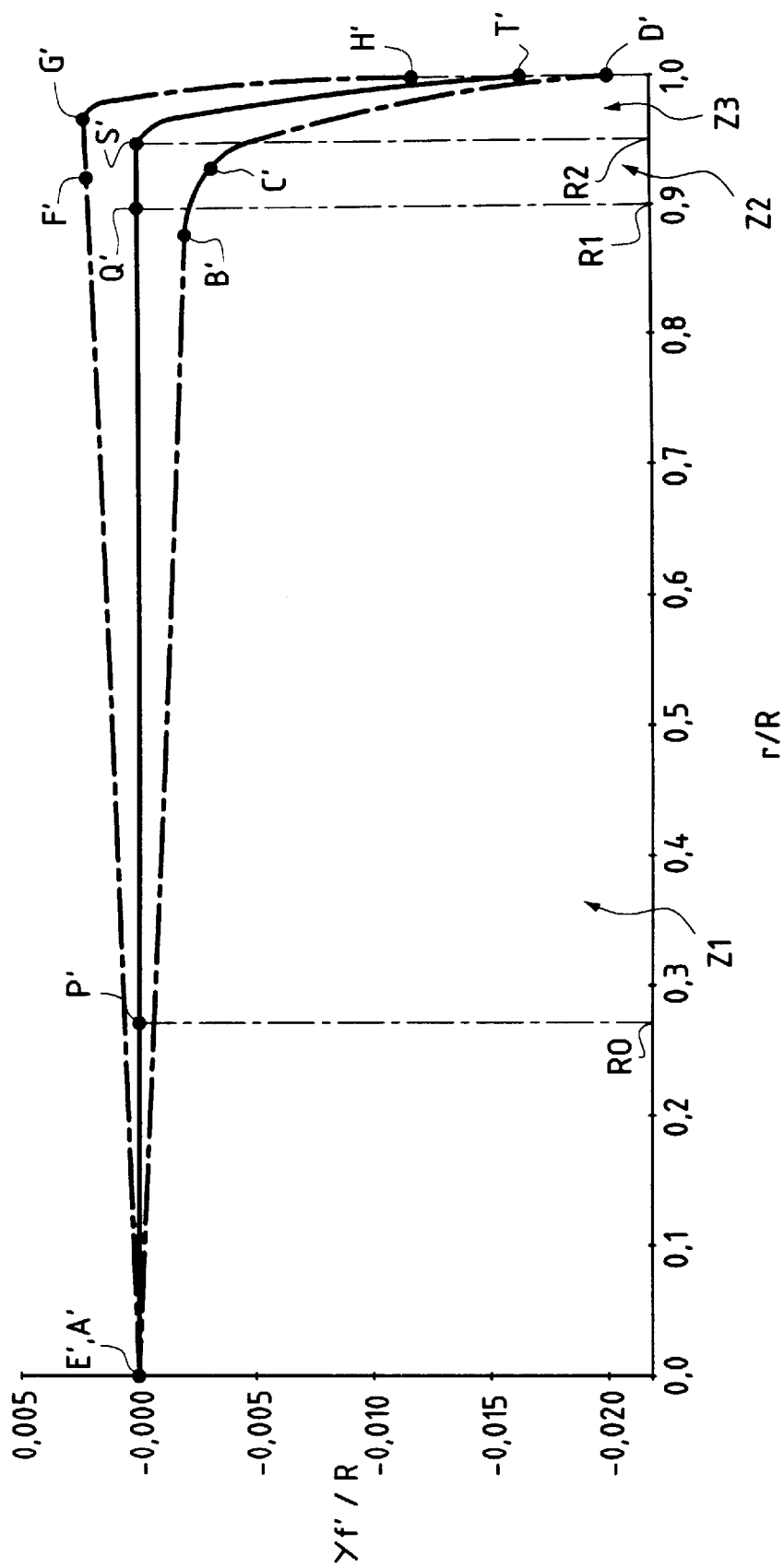
FIG. 3 is a curve showing the variation in the offset of the aerodynamic center along the longitudinal extent of the blade.

Likewise, as may be seen in FIG. 3, the variation in or law of variation of the offset Y'f of the aerodynamic center is preferably between:

a lower bound A'B'C'D', such that the coordinates of the points A', B', C' and D' are the following:

|   | r/R | Y'f/R |
|---|---|---|
| A' | 0 | 0 |
| B' | 0.88 | −0.002 |
| C' | 0.93 | −0.003 |
| D' | 1 | −0.02 | the lines A'B', B'C' and C'D' joining these points, in order to form the bound A'B'C'D', being such that:

|    | x | Y'f/R |
|---|---|---|
| A'B' | (r-Ra')/(Rb'-Ra') | −0.002 x |
| B'C' | (r-Rb')/(Rc'-Rb') | −0.002 − 0.001 x |
| C'D' | (r-Rc')/(Rd'-Rc') | −0.003 − 0.0014 x − 0.0156 $x^2$ |

Ra', Rb', Rc' and Rd' representing the respective position of A', B', C' and D' along the blade and $\underline{x}$ being a parameter; and an upper bound E'F'G'H', such that the coordinates of the points E', F', G', and H' are the following:

|   | r/R | L/$\bar{L}$ |
|---|---|---|
| E' | 0 | 0 |
| F' | 0.92 | +0.002 |
| G' | 0.97 | +0.002 |
| H' | 1 | −0.012 | the lines E'F', F'G' and G'H' joining these points, in order to form the bound E'F'G'H', being such that:

|  | x | Y'f/R |
| --- | --- | --- |
| E'F' | (r-Re')/(Rf'-Re') | +0.002 x |
| F'G' | (r-Rf')/(Rg'-Rf') | +0.002 |
| G'H' | (r-Rg')/(Rh'-Rg') | +0.002 − 0.014 x$^2$ |

Re', Rf'Rg' and Rh' representing the respective position of E', F', G' and H' along the blade.

Between the lower bound A'B'C'D' and the upper bound E'F'G'H', a preferred curve P'Q'S'T', as shown in FIG. 3, is formed by the points P', Q', S' and T', the coordinates of which are the following:

|  | r/R | Y'f/R |
| --- | --- | --- |
| P' | 0.2682 | 0 |
| Q' | 0.9 | 0 |
| R' | 0.95 | 0 |
| S' | 1 | −0.0162619 | the lines P'Q', Q'S' and S'T' joining these points, in order to form the curve P'Q'S'T', being such that:

|  | x | Y'f/R |
| --- | --- | --- |
| P'Q' | (r-Rp')/(Rq'-Rp') | 0 |
| Q'S' | (r-Rq')/(Rs'-Rq') | 0 |
| S'T' | (r-Rs')/(Rt'-Rs') | −0.0162619x$^2$ | with Rp', Rq', Rs' and Rt' representing the respective position of P', Q', S' and T' along the blade.

Figure 4:
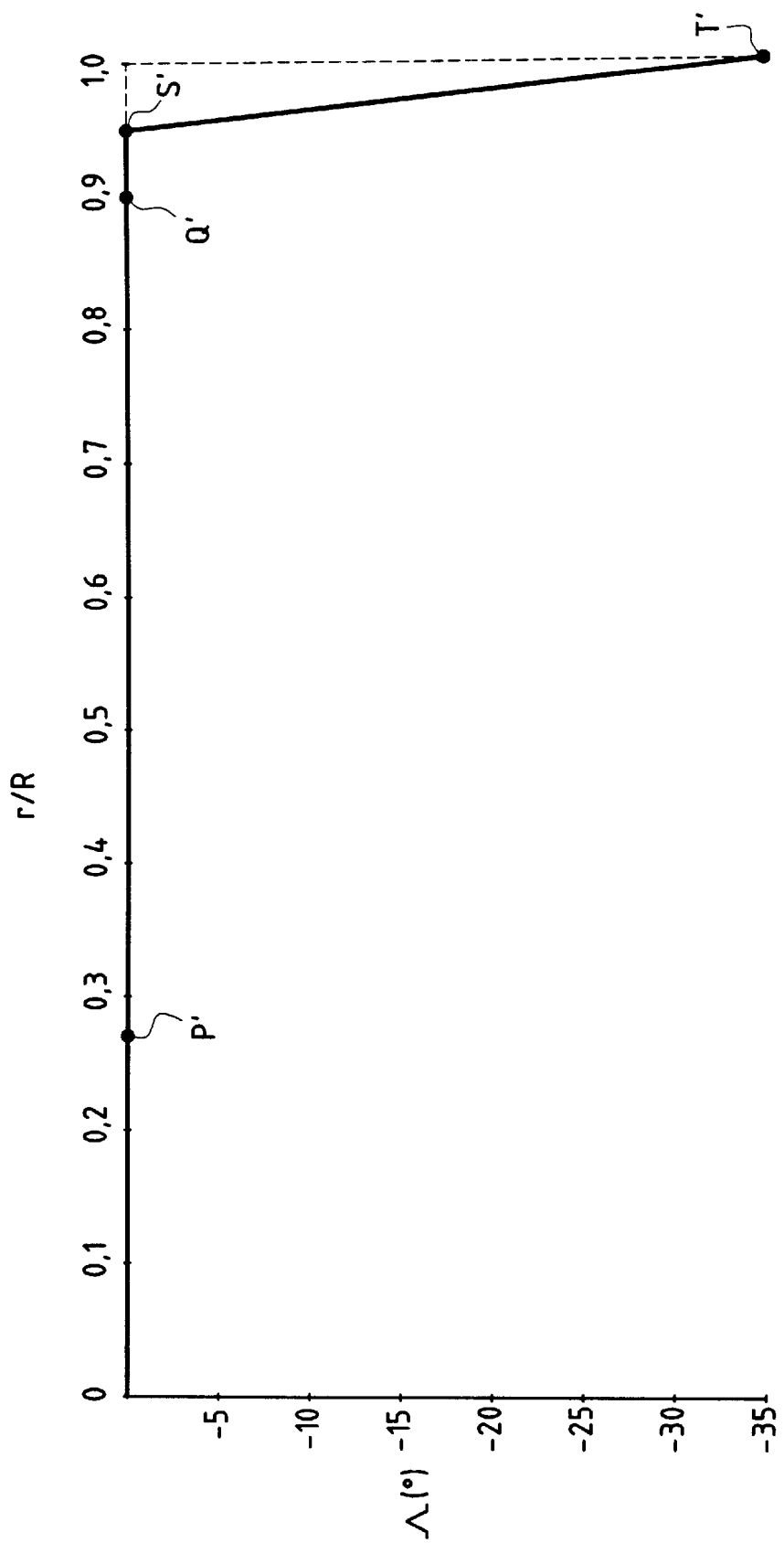
FIG. 4 is a curve showing the variation in the sweep angle, which corresponds to the recommended variation in the offset, as illustrated in FIG. 3.

Moreover, FIG. 4 shows a curve P'Q'S'T' illustrating the variation in the sweep angle Λ in degrees, along the longitudinal extent of the blade. This curve is directly linked with the curve depicted in FIG. 3 and showing the variation in the offset of the aerodynamic center.

Furthermore, with regard to the relative thickness, the blade 1 is defined according to a division into zones which is different from the aforementioned division relating to FIGS. 2 and 3 with regard to the variation in the chord length and in the aerodynamic offset.

Figure 5:
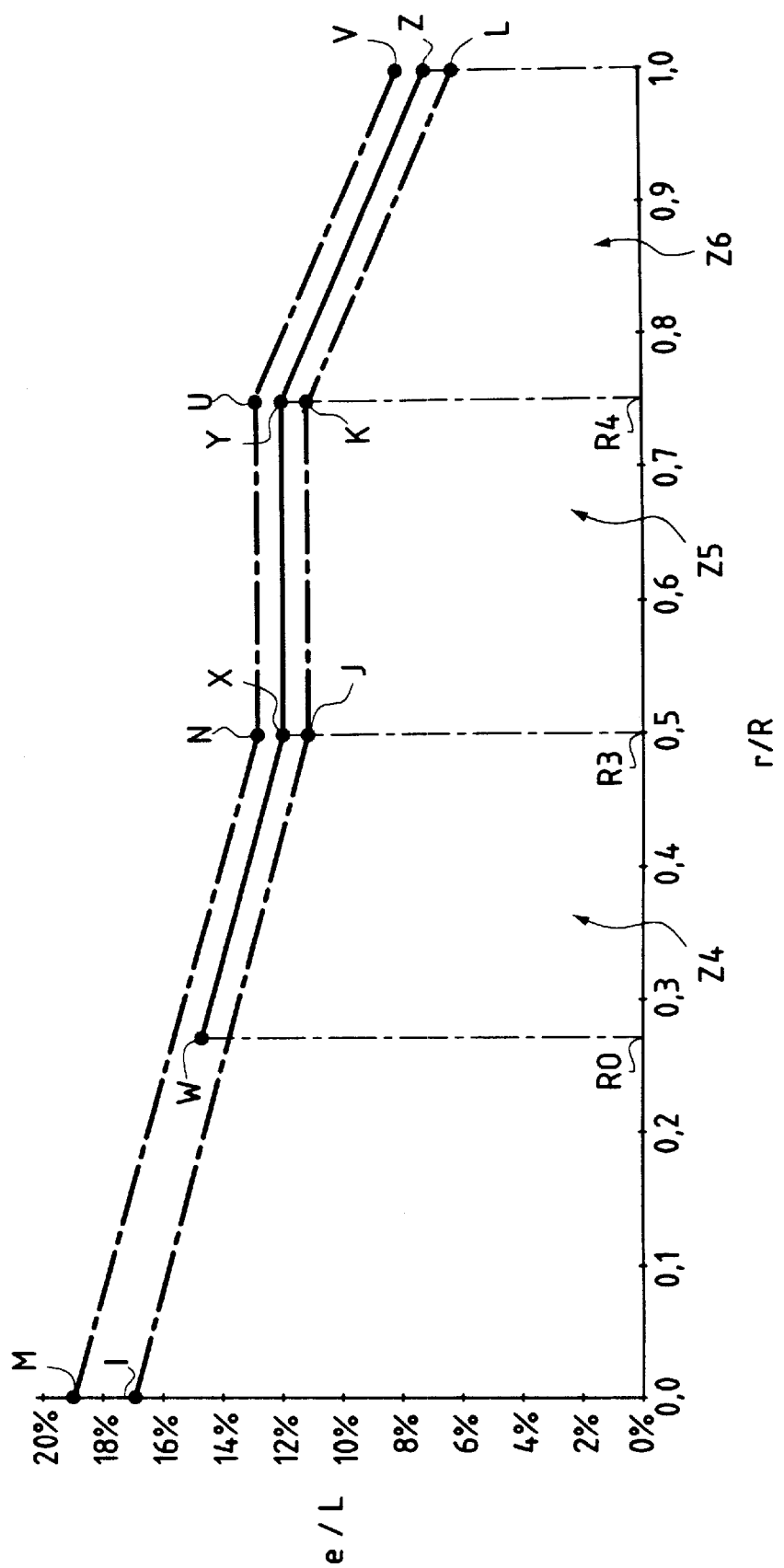
FIG. 5 is a curve showing the variation in the relative thickness of the straight blade sections.

For this purpose, the blade 1 is subdivided into three zones Z4, Z5 and Z6, namely, as illustrated in FIG. 5:
- a first zone Z4, which extends from the section RO, corresponding to the start of the span, as far as a section R3 located approximately at 50% of the total radius R;
- a second zone Z5, which extends from the section R3 as far as a section R4 located approximately at 75% of the total radius R; and
- a third zone Z6, which extends from the section R4 as far as the blade tip (radius R).

According to the invention, the relative thickness of the blade, which corresponds to the ratio of the absolute thickness e to the chord length L:
- decreases approximately linearly with an approximate slope of −0.12% of thickness per % of span in said zone Z4 so as to end up with a relative thickness approximately equal to 12% in the section R3;
- remains constant and approximately equal to 12% in said zone Z5; and
- decreases approximately linearly in said zone Z6 so as to reach a value approximately equal to 7% at the free outboard end R of the blade 1.

As may be seen in FIG. 5, the variation or law of variation in the relative thickness (e/L) may advantageously be between:
a lower bound IJKL, such that the coordinates of the points I, J, K, and L are the following:

|  | r/R | e/L |
| --- | --- | --- |
| I | 0 | 0.17 |
| J | 0.5 | 0.11 |
| K | 0.75 | 0.11 |
| L | 1 | 0.06 | the lines IJ, JK and KL joining these points, in order to form the bound IJKL, being such that:

|  | x | e/L |
| --- | --- | --- |
| IJ | (r-Ri)/(Rj-Ri) | 0.17 − 0.06 x |
| JK | (r-Rj)/(Rk-Rj) | 0.11 |
| KL | (r-Rk)/(Rl-Rk) | 0.11 − 0.05 x |

Ri, Rj, Rk and Rl representing the respective position of I, J, K and L along the blade and x being a parameter; and an upper bound MNUV, such that the coordinates of the points M, N, U and V are the following:

|  | r/R | e/L |
| --- | --- | --- |
| M | 0 | 0.19 |
| N | 0.5 | 0.13 |
| U | 0.75 | 0.13 |
| V | 1 | 0.08 | the lines MN, NU and UV joining these points, in order to form the bound MNUV, being such that:

|  | x | e/L |
| --- | --- | --- |
| MN | (r-Rm)/(Rn-Rm) | 0.19 − 0.06 x |
| NU | (r-Rn)/(Ru-Rn) | 0.13 |
| UV | (r-Ru)/(Rv-Ru) | 0.13 − 0.05 x |

Rm, Rn, Ru and Rv representing the respective position of M, N, U and V along the blade.

Between the lower bound IJKL and the upper bound MNUV, a preferred curve WXYZ, as shown in FIG. 5, is formed by the points W, X, Y and Z, the coordinates of which are the following:

|  | r/R | e/L |
| --- | --- | --- |
| W | 0.2682 | 0.15 |
| X | 0.5 | 0.12 |
| Y | 0.75 | 0.12 |
| Z | 1 | 0.07 | the lines WX, XY and YZ joining these points, in order to form the bound WXYZ, being such that:

|     | x              | e/L            |
| --- | -------------- | -------------- |
| WX  | (r-Rw)/(Rx-Rw) | 0.15 − 0.03 x  |
| XY  | (r-Rx)/(Ry-Rx) | 0.12           |
| YZ  | (r-Ry)/(Rz-Ry) | 0.12 − 0.05 x  |

Rw, Rx, Ry and Rz representing the respective position of W, X, Y and Z along the blade.

Moreover, in one particular embodiment, the vertical displacement Zv of the center of twist with respect to the plane of zero lift of the blade 1 is such that the center of twist remains approximately in said plane in said first and second zones Z1 and Z2, and in the third zone Z3:

$Zv(r/R)/R = -0.0905x^2$ with $x=(r-R2)/(R-R2)$.

This variation in the offset or displacement Zv makes it possible to improve the lift efficiency at takeoff.

However, it is also conceivable within the context of the invention to apply no vertical offset so as to limit the vibration excitation in translational flight, renouncing the advantage provided in terms of lift efficiency.

Furthermore, advantageously, the blade has a linear aerodynamic twist with a total amplitude approximately equal to −10° between the center of the rotor and the free outboard end R of the blade. In accordance with common practice, the twist is counted negatively when the leading edge of the outer sections is reduced with respect to that of the sections lying closer to the center. In order to obtain the geometrical setting of each section, counted with respect to the reference chord, it is necessary to add (algebraically) the effect of zero lift of the profile in question to the aerodynamic twist.

What is claimed is:

1. A blade with a swept-back tip for the rotary wings of an aircraft, intended to form part of a rotor whose hub is linked to said blade (1), which blade is capable of being driven in rotation about the axis of said hub, said blade (1) having a leading edge (2) and a trailing edge (3), and being formed from successive elementary cross sections identified by the distance <u>r</u> which separates each of them from the rotation axis of said hub, and each having a defined chord profile and an aerodynamic center whose offset with respect to the feathering axis (OX), orthogonal to each of said sections, determines the sweepback of said blade, wherein, said blade (1) being subdivided along its longitudinal extent into three zones (Z1, Z2, Z3), namely a first zone (Z1) extending from the inboard end RO of the blade to a section R1 located at approximately 90% of the total length of the blade, a second zone (Z2) extending from the section R1 to a section R2 located at approximately 95% of the total length of the blade and a third zone (Z3) extending from the section R2 to the free outboard end R of the blade:

the length of the chord L is a maximum and approximately constant in said first zone (Z1), decreases linearly in said second zone (Z2) and decreases according to a parabolic function in said third zone (Z3) while respecting the continuity of the rate of variation of the chord at the common limit with the second zone (Z2); and the offset Y'f of the aerodynamic center with respect to the feathering axis is approximately zero in said first and second zones (Z1, Z2) and decreases according to a parabolic function in said third zone (Z3), while respecting the continuity of the sweep angle (A) at the common limit with the second zone (Z2) and furthermore ensuring the straightness of the trailing edge (3) of the blade (1) along said second and third zones (Z2, Z3).

2. The blade as claimed in claim 1, wherein the variation in the chord length L with respect to the mean length $\bar{L}$ of the latter is between:

a lower bound ABCD, such that the coordinates of the points A, B, C and D are the following:

|   | r/R  | L/$\bar{L}$ |
| - | ---- | ---- |
| A | 0    | 1.04 |
| B | 0.88 | 1.04 |
| C | 0.93 | 0.86 |
| D | 1    | 0.25 | the lines AB, BC and CD joining these points, in order to form the bound ABCD, being such that:

|     | x              | L/$\bar{L}$                 |
| --- | -------------- | --------------------------- |
| AB  | (r-Ra)/(rb-Ra) | 1.04                        |
| BC  | (r-Rb)/(rc-Rb) | 1.04 − 0.18 x               |
| CD  | (r-Rc)/(rd-Rc) | 0.86 − 0.252 x − 0.358 $x^2$ |

Ra, Rb, Rc and Rd representing the respective position of A, B, C and D along the blade (1) and <u>x</u> being a parameter; and an upper bound EFGH, such that the coordinates of the points E, F, G and H are the following:

|   | r/R  | L/$\bar{L}$ |
| - | ---- | ---- |
| E | 0    | 1.1  |
| F | 0.92 | 1.1  |
| G | 0.97 | 0.92 |
| H | 1    | 0.45 | the lines EF, FG and GH joining these points, in order to form the bound EFGH, being such that:

|     | x              | L/$\bar{L}$                 |
| --- | -------------- | --------------------------- |
| EF  | (r-Re)/(Rf-Re) | 1.1                         |
| FG  | (r-Rf)/(Rg-Rf) | 1.1 − 0.18 x                |
| GH  | (r-Rg)/(Rh-Rg) | 0.92 − 0.108 x − 0.362 $x^2$ |

Re, Rf, Rg and Rh representing the respective position of E, F, G and H along the blade (1).

3. The blade as claimed in claim 2, wherein, between the lower bound ABCD and upper bound EFGH, a preferred curve PQST is formed by points P, Q, S and T, the coordinates of which are the following:

|   | r/R    | L/$\bar{L}$ |
| - | ------ | --------- |
| P | 0.2682 | 1.0694444 |
| Q | 0.9    | 1.0694444 |
| S | 0.95   | 0.8911111 |
| T | 1      | 0.3333333 | the lines PQ, QS and ST joining these points, in order to form the curve PQST, being such that:

|     | x                | L/L̄                                      |
|-----|------------------|-------------------------------------------|
| PQ  | (r-Rp)/(Rq-Rp)   | 1.0694444                                 |
| QS  | (r-Rq)/(Rs-Rq)   | 1.0694444 − 0.1783333 x                   |
| ST  | (r-Rs)/(Rt-Rs)   | 0.8911111 − 0.1783333 x − 0.3794445 $x^2$ |

Rp, Rq, Rs and Rt representing the respective position of P, Q, S and T along the blade (1).

4. The blade as claimed in claim 1, wherein the variation in the offset Y'f of the aerodynamic center is between:

a lower bound A'B'C'D', such that the coordinates of the points A', B', C' and D' are the following:

|    | r/R  | Y'f/R  |
|----|------|--------|
| A' | 0    | 0      |
| B' | 0.88 | −0.002 |
| C' | 0.93 | −0.003 |
| D' | 1    | −0.02  | the lines A'B', B'C' and C'D' joining these points, in order to form the bound A'B'C'D', being such that:

|      | x                  | Y'f/R                         |
|------|--------------------|-------------------------------|
| A'B' | (r-Ra')/(Rb'-Ra')  | −0.002 x                      |
| B'C' | (r-Rb')/(Rc'-Rb')  | −0.002 − 0.001 x              |
| C'D' | (r-Rc')/(Rd'-Rc')  | −0.003 − 0.0014 x − 0.0156 $x^2$ |

Ra', Rb', Rc' and Rd' representing the respective position of A', B', C' and D' along the blade (1) and x being a parameter; and an upper bound E'F'G'H', such that the coordinates of the points E', F', G', and H' are the following:

|    | r/R  | L/L̄    |
|----|------|--------|
| E' | 0    | 0      |
| F' | 0.92 | +0.002 |
| G' | 0.97 | +0.002 |
| H' | 1    | −0.012 | the lines E'F', F'G' and G'H' joining these points, in order to form the bound E'F'G'H', being such that:

|      | x                 | Y'f/R              |
|------|-------------------|--------------------|
| E'F' | (r-Re')/(Rf'-Re') | +0.002 x           |
| F'G' | (r-Rf')/(Rg'-Rf') | +0.002             |
| G'H' | (r-Rg')/(Rh'-Rg') | +0.002 − 0.014 $x^2$ |

Re', Rf' Rg' and Rh' representing the respective position of E', F', G' and H' along the blade (1).

5. The blade as claimed in claim 4, wherein, between the lower bound A'B'C'D' and upper bound E'F'G'H', a preferred curve P'Q'S'T' is formed by the points P', Q', S' and T', the coordinates of which are the following:

|    | r/R    | Y'f/R      |
|----|--------|------------|
| P' | 0.2682 | 0          |
| Q' | 0.9    | 0          |
| S' | 0.95   | 0          |
| T' | 1      | −0.0162619 | the lines P'Q', Q'S' and S'T' joining these points, in order to form the curve P'Q'S'T', being such that:

|      | x                 | Y'f/R         |
|------|-------------------|---------------|
| P'Q' | (r-Rp')/(Rq'-Rp') | 0             |
| Q'S' | (r-Rq')/(Rs'-Rq') | 0             |
| S'T' | (r-Rs')/(Rt'-Rs') | −0.0162619$x^2$ |

Rp', Rq', Rs' and Rt' representing the respective position of P', Q', S' and T along the blade (1).

6. The blade as claimed in claim 1, wherein, said blade (1) being, in addition, subdivided along its longitudinal extent into three additional zones (Z4, Z5, Z6), namely a first additional zone (Z4) extending from the inboard end RO of the blade to a section R3 located at approximately 50% of the total length of the blade, a second additional zone (Z5) extending from the section R3 to a section R4 located at approximately 75% of the total length of the blade and a third additional zone (Z6) extending from the section R4 to the free outboard end R of the blade, the relative thickness of the blade, which corresponds to the ratio of the absolute thickness e to the chord length L:

decreases approximately linearly with an approximate slope of −0.12% of thickness per % of span in said first additional zone (Z4) so as to end up with a relative thickness approximately equal to 12% in the section R3;

remains constant and approximately equal to 12% in said second additional zone (Z5); and decreases approximately linearly in said third additional zone (Z6) so as to reach a value approximately equal to 7% at the free outboard end (R) of the blade.

7. The blade as claimed in claim 6, wherein the variation in the relative thickness e/L of the sections is between:

a lower bound IJKL, such that the coordinates of the points I, J, K, and L are the following:

|   | r/R  | e/L  |
|---|------|------|
| I | 0    | 0.17 |
| J | 0.5  | 0.11 |
| K | 0.75 | 0.11 |
| L | 1    | 0.06 | the lines IJ, JK and KL joining these points, in order to form the bound IJKL, being such that:

|    | x              | e/L           |
|----|----------------|---------------|
| IJ | (r-Ri)/(Rj-Ri) | 0.17 − 0.06 x |
| JK | (r-Rj)/(Rk-Rj) | 0.11          |
| KL | (r-Rk)/(Rl-Rk) | 0.11 − 0.05 x |

Ri, Rj, Rk and Rl representing the respective position of I, J, K and L along the blade (1) and x being a parameter; and an upper bound MNUV, such that the coordinates of the points M, N, U and V are the following:

|   | r/R | e/L |
|---|---|---|
| M | 0 | 0.19 |
| N | 0.5 | 0.13 |
| U | 0.75 | 0.13 |
| V | 1 | 0.08 | the lines MN, NU and UV joining these points, in order to form the bound MNUV, being such that:

|   | x | e/L |
|---|---|---|
| MN | (r-Rm)/(Rn-Rm) | 0.19 − 0.06 x |
| NU | (r-Rn)/(Ru-Rn) | 0.13 |
| UV | (r-Ru)/(Rv-Ru) | 0.13 − 0.05 x |

Rm, Rn, Ru and Rv representing the respective position of M, N, U and V along the blade (1).

8. The blade as claimed in claim 7, wherein, between the lower bound IJKL and the upper bound MNUV, a preferred curve WXYZ is formed by the points W, X, Y and Z, the coordinates of which are the following:

|   | r/R | e/L |
|---|---|---|
| W | 0.2682 | 0.15 |
| X | 0.5 | 0.12 |
| Y | 0.75 | 0.12 |
| Z | 1 | 0.07 | the lines WX, XY and YZ joining these points, in order to form the bound WXYZ, being such that:

|   | x | e/L |
|---|---|---|
| WX | (r-Rw)/(Rx-Rw) | 0.15 − 0.03 x |
| XY | (r-Rx)/(Ry-Rx) | 0.12 |
| YZ | (r-Ry)/(Rz-Ry) | 0.12 − 0.05 x |

Rw, Rx, Ry and Rz representing the respective position of W, X, Y and Z along the blade.

9. The blade as claimed in claim 1, wherein the vertical displacement Zv of the center of twist with respect to the plane of zero lift of the blade is such that the center of twist remains approximately in said plane in said first and second zones (Z1, Z2), and in the third zone (Z3):

$Zv(r/R)/R = -0.0905 x^2$ with $x=(r-R2)/(R-R2)$.

10. The blade as claimed in claim 1, which has a linear aerodynamic twist with a total amplitude approximately equal to −10° between the center of the rotor and the free outboard end (R) of the blade (1).

* * * * *